(12) United States Patent
Weder (10) Patent No.: US 6,591,549 B2
(45) Date of Patent: Jul. 15, 2003

(54) METHOD OF USING A CONICAL FLORAL SLEEVE

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

(21) Appl. No.: 10/279,812

(22) Filed: Oct. 23, 2002

(65) Prior Publication Data

US 2003/0051403 A1 Mar. 20, 2003

Related U.S. Application Data

(62) Division of application No. 09/614,317, filed on Jul. 12, 2000, which is a continuation-in-part of application No. 09/468,579, filed on Dec. 21, 1999, now Pat. No. 6,318,050, which is a continuation of application No. 09/162,479, filed on Sep. 28, 1998, now Pat. No. 6,047,524, which is a continuation of application No. 08/872,772, filed on Jun. 10, 1997, now Pat. No. 5,813,194, which is a continuation of application No. 08/701,818, filed on Aug. 23, 1996, now Pat. No. 5,735,103, which is a continuation of application No. 08/220,852, filed on Mar. 31, 1994, now Pat. No. 5,572,851.

(51) Int. Cl.$^7$ ................................................ A47G 7/08
(52) U.S. Cl. .......................................................... 47/72
(58) Field of Search .................. 47/72, 41.01; 206/423; 53/397, 399

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ........................... 229/87 |
| 1,794,212 A | 2/1931 | Snyder |
| 1,811,574 A | 6/1931 | Barrett |
| 1,863,216 A | 6/1932 | Wordingham |
| 1,978,631 A | 10/1934 | Herrlinger ..................... 91/68 |
| 2,048,123 A | 7/1936 | Howard ........................ 229/87 |
| RE21,065 E | 5/1939 | Copeman ......................... 93/2 |
| 2,170,147 A | 8/1939 | Lane ............................ 206/56 |
| 2,171,835 A * | 9/1939 | Mackie .......................... 47/72 |
| 2,200,111 A | 5/1940 | Bensel ........................ 229/1.5 |
| 2,278,673 A | 4/1942 | Savada et al. ................. 154/43 |
| 2,302,259 A | 11/1942 | Rothfuss ........................ 41/10 |
| 2,323,287 A | 7/1943 | Amberg ........................ 229/53 |
| 2,355,559 A | 8/1944 | Renner .......................... 229/8 |
| 2,371,985 A | 3/1945 | Freiberg ....................... 206/46 |
| 2,411,328 A | 11/1946 | MacNab ......................... 33/12 |

(List continued on next page.)

FOREIGN PATENT DOCUMENTS

| | | |
|---|---|---|
| AU | 4231978 | 6/1979 |
| BE | 654427 | 1/1965 |
| CH | 560532 | 4/1975 |

(List continued on next page.)

OTHER PUBLICATIONS

Speed Cover Brochure, "The Simple Solution For Those Peak Volume Periods", Highland Supply Corporation, ©1989.

(List continued on next page.)

*Primary Examiner*—Peter M. Poon
*Assistant Examiner*—Jeffrey L. Gellner
(74) *Attorney, Agent, or Firm*—Dunlap, Codding & Rogers (57) ABSTRACT

A method of using a floral sleeve sized to fit a flower pot, or a floral grouping, the sleeve generally having a conical shape and having a bonding material disposed thereon for connecting the sleeve to a pot disposed within the sleeve or connected via a banding element to a pot disposed within the sleeve.

8 Claims, 4 Drawing Sheets

U.S. PATENT DOCUMENTS

| | | | | |
|---|---|---|---|---|
| 2,510,120 A | | 6/1950 | Leander .................. 117/122 |
| 2,529,060 A | | 11/1950 | Trillich .................. 117/68.5 |
| 2,621,142 A | | 12/1952 | Wetherell ................ 154/117 |
| 2,648,487 A | | 8/1953 | Linda ...................... 229/55 |
| 2,688,354 A | | 9/1954 | Berger ...................... 150/28 |
| 2,749,010 A | * | 6/1956 | Amberg et al. .......... 229/400 |
| 2,774,187 A | | 12/1956 | Smithers .................... 47/41 |
| 2,822,287 A | | 2/1958 | Avery ...................... 117/14 |
| 2,846,060 A | | 8/1958 | Young ...................... 206/58 |
| 2,850,842 A | | 9/1958 | Eubank, Jr. ................ 47/58 |
| 2,883,262 A | | 4/1959 | Borin ........................ 21/56 |
| 2,989,828 A | | 6/1961 | Warp ........................ 53/390 |
| 3,022,605 A | | 2/1962 | Reynolds .................... 47/58 |
| 3,080,680 A | | 3/1963 | Reynolds .................... 47/37 |
| 3,094,810 A | | 6/1963 | Kaplin ...................... 47/37 |
| 3,121,647 A | | 2/1964 | Harris et al. ............ 118/202 |
| 3,130,113 A | | 4/1964 | Silman .................... 161/97 |
| 3,271,922 A | | 9/1966 | Wallerstein et al. ......... 53/3 |
| 3,293,100 A | | 12/1966 | Questel |
| 3,316,675 A | | 5/1967 | Cartwright, Jr. |
| 3,322,325 A | | 5/1967 | Bush ........................ 229/62 |
| 3,376,666 A | | 4/1968 | Leonard .................... 47/41 |
| 3,380,646 A | | 4/1968 | Doyen et al. .............. 229/57 |
| 3,431,706 A | | 3/1969 | Stuck ...................... 53/390 |
| 3,508,372 A | | 4/1970 | Wallerstein et al. ......... 53/3 |
| 3,510,054 A | | 5/1970 | Sanni et al. .............. 229/66 |
| 3,512,700 A | | 5/1970 | Evans et al. .............. 229/53 |
| 3,550,318 A | | 12/1970 | Remke et al. .............. 47/37 |
| 3,552,059 A | | 1/1971 | Moore .................. 47/41.12 |
| 3,554,434 A | | 1/1971 | Anderson ................ 229/55 |
| 3,556,389 A | | 1/1971 | Gregoire .................. 229/53 |
| 3,557,516 A | | 1/1971 | Brandt ...................... 53/14 |
| 3,620,366 A | | 11/1971 | Parkinson ................ 206/59 |
| 3,681,105 A | | 8/1972 | Milutin .................... 117/15 |
| 3,767,104 A | * | 10/1973 | Bachman et al. ........ 206/423 |
| 3,793,799 A | | 2/1974 | Howe ........................ 53/32 |
| 3,869,828 A | | 3/1975 | Matsumoto .............. 47/34.11 |
| 3,888,443 A | | 6/1975 | Flanigen .................. 248/152 |
| 3,962,503 A | | 6/1976 | Crawford .................. 428/40 |
| 4,043,077 A | | 8/1977 | Stonehocker .............. 47/66 |
| 4,054,697 A | | 10/1977 | Reed et al. ................ 428/40 |
| 4,091,925 A | | 5/1978 | Griffo et al. ............ 206/423 |
| 4,113,100 A | | 9/1978 | Soja et al. .............. 206/602 |
| 4,118,890 A | | 10/1978 | Shore ........................ 47/28 |
| 4,149,339 A | | 4/1979 | Hall et al. .................. 47/67 |
| 4,158,631 A | * | 6/1979 | Whelan .................. 210/497.1 |
| 4,189,868 A | | 2/1980 | Tymchuck et al. .......... 47/84 |
| 4,216,620 A | | 8/1980 | Weder et al. .............. 47/72 |
| 4,248,347 A | | 2/1981 | Trimbee .................. 206/423 |
| D259,333 S | | 5/1981 | Charbonneau ............ D9/306 |
| 4,265,049 A | | 5/1981 | Gorewitz .................. 47/26 |
| 4,280,314 A | | 7/1981 | Stuck ...................... 53/241 |
| 4,290,573 A | * | 9/1981 | Shapiro .................. 248/152 |
| 4,297,811 A | | 11/1981 | Weder ...................... 47/72 |
| 4,333,265 A | * | 6/1982 | Arnold ...................... 47/74 |
| 4,333,267 A | | 6/1982 | Witte ........................ 47/84 |
| 4,347,686 A | | 9/1982 | Wood ........................ 47/73 |
| 4,380,564 A | | 4/1983 | Cancio et al. ............ 428/167 |
| 4,400,910 A | | 8/1983 | Koudstall et al. .......... 47/84 |
| 4,413,725 A | | 11/1983 | Bruno et al. .......... 206/45.33 |
| 4,508,223 A | | 4/1985 | Catrambone .............. 206/423 |
| D279,279 S | | 6/1985 | Wagner .................. D11/143 |
| 4,546,875 A | | 10/1985 | Zweber .................. 206/0.82 |
| 4,621,733 A | | 11/1986 | Harris .................... 206/423 |
| 4,640,079 A | | 2/1987 | Stuck ...................... 53/390 |
| 4,717,262 A | | 1/1988 | Roen et al. .............. 383/120 |
| 4,733,521 A | | 3/1988 | Weder et al. .............. 53/580 |
| 4,765,464 A | | 8/1988 | Ristvedt .................. 206/0.82 |
| 4,771,573 A | | 9/1988 | Stengel .................... 47/67 |
| 4,773,182 A | | 9/1988 | Weder et al. .............. 47/72 |
| 4,801,014 A | | 1/1989 | Meadows ................ 206/423 |
| 4,810,109 A | | 3/1989 | Castel .................... 383/105 |
| 4,835,834 A | | 6/1989 | Weder ...................... 29/525 |
| D301,991 S | | 7/1989 | Van Sant ................ D11/149 |
| 4,900,390 A | | 2/1990 | Colton et al. ............ 156/291 |
| 4,941,572 A | | 7/1990 | Harris .................... 206/423 |
| 4,946,290 A | | 8/1990 | Matyja .................... 383/10 |
| 4,980,209 A | | 12/1990 | Hill ...................... 428/34.1 |
| 4,989,396 A | | 2/1991 | Weder et al. .............. 53/397 |
| D315,700 S | | 3/1991 | Stephens ................ D11/151 |
| 5,033,232 A | * | 7/1991 | Vaughn .................... 47/72 |
| 5,073,161 A | | 12/1991 | Weder et al. ............ 493/154 |
| 5,074,675 A | | 12/1991 | Osgood .................. 383/122 |
| 5,076,011 A | | 12/1991 | Stehouwer |
| 5,105,599 A | | 4/1992 | Weder .................... 53/399 |
| 5,111,638 A | | 5/1992 | Weder .................... 53/397 |
| 5,117,584 A | | 6/1992 | Ottenwalder |
| 5,120,382 A | | 6/1992 | Weder .................... 156/212 |
| 5,152,100 A | | 10/1992 | Weder et al. .............. 47/72 |
| 5,181,364 A | | 1/1993 | Weder .................... 53/397 |
| D335,105 S | | 4/1993 | Ottenwalder et al. ...... D11/164 |
| 5,199,242 A | | 4/1993 | Weder et al. .............. 53/397 |
| 5,205,108 A | | 4/1993 | Weder et al. .............. 53/397 |
| 5,228,234 A | | 7/1993 | de Klerk et al. .......... 47/41.01 |
| 5,235,782 A | | 8/1993 | Landau .................... 47/72 |
| 5,239,775 A | | 8/1993 | Landau .................... 47/72 |
| 5,249,407 A | | 10/1993 | Stuck .................... 53/399 |
| 5,259,106 A | | 11/1993 | Weder et al. .......... 29/469.5 |
| 5,307,606 A | | 5/1994 | Weder .................... 53/410 |
| 5,315,785 A | | 5/1994 | Avôt et al. ................ 47/72 |
| 5,335,476 A | * | 8/1994 | Weder .................... 53/397 |
| 5,350,240 A | | 9/1994 | Billman et al. .......... 383/104 |
| 5,353,575 A | | 10/1994 | Stepanek ................ 53/461 |
| 5,361,482 A | | 11/1994 | Weder et al. .............. 29/469 |
| 5,388,695 A | | 2/1995 | Gilbert .................. 206/423 |
| 5,428,939 A | | 7/1995 | Weder et al. .............. 53/397 |
| 5,443,670 A | | 8/1995 | Landau .................. 156/191 |
| 5,493,809 A | | 2/1996 | Weder et al. .............. 47/72 |
| D368,025 S | | 3/1996 | Sekerak et al. ............ D9/305 |
| 5,496,251 A | | 3/1996 | Cheng .................... 493/224 |
| 5,496,252 A | | 3/1996 | Gilbert .................. 493/224 |
| 5,526,932 A | | 6/1996 | Weder .................... 206/423 |
| 5,551,570 A | | 9/1996 | Shaffer et al. .......... 206/575 |
| 5,572,849 A | | 11/1996 | Weder et al. .............. 53/399 |
| 5,572,851 A | | 11/1996 | Weder .................... 53/399 |
| 5,575,133 A | | 11/1996 | Weder et al. .............. 53/397 |
| 5,617,703 A | | 4/1997 | Weder .................... 53/413 |
| 5,624,320 A | | 4/1997 | Martinez .................. 472/51 |
| 5,625,979 A | | 5/1997 | Weder |
| 5,647,168 A | | 7/1997 | Gilbert .................... 47/72 |
| 5,647,193 A | | 7/1997 | Weder et al. .............. 53/465 |
| 5,706,605 A | | 1/1998 | Alcazar .................. 47/65.7 |
| 5,715,944 A | | 2/1998 | Windisch ................ 206/423 |
| 5,735,103 A | | 4/1998 | Weder .................... 53/399 |
| 5,758,472 A | | 6/1998 | Weder |
| 5,813,194 A | | 9/1998 | Weder .................... 53/399 |
| D404,684 S | | 1/1999 | Shea .................... D11/164 |
| 5,924,241 A | | 7/1999 | Hodge .................... 47/72 |
| 5,941,020 A | | 8/1999 | Weder .................... 47/72 |
| 5,966,866 A | | 10/1999 | Ferguson ................ 47/41.01 |
| 5,974,730 A | | 11/1999 | Chien .................... 47/41.01 |
| D419,436 S | | 1/2000 | Celtorius et al. .......... D9/305 |
| 6,009,687 A | | 1/2000 | Weder .................... 53/399 |
| 6,047,524 A | | 4/2000 | Weder .................... 53/399 |
| D424,972 S | | 5/2000 | Ferguson ................ D11/143 |
| 6,098,336 A | | 8/2000 | Ferguson ................ 206/423 |
| 6,129,208 A | | 10/2000 | Ferguson ................ 206/423 |
| 6,129,209 A | | 10/2000 | Tchira .................. 206/423 |
| 6,141,906 A | | 11/2000 | Weder .................... 47/72 |
| 6,182,395 B1 | | 2/2001 | Weder .................... 47/72 |
| 6,183,590 B1 | | 2/2001 | Weder .................... 47/72 |

FOREIGN PATENT DOCUMENTS

| | | | |
|---|---|---|---|
| DE | 15550 | 6/1900 | |
| DE | 345464 | 12/1921 | |
| DE | 513971 | 11/1930 | |
| DE | 1166692 | 3/1964 | |
| DE | 1962947 | 6/1971 | |
| DE | 2060812 | 11/1971 | |
| DE | 2748626 | 5/1979 | |
| DE | 3445799 | 6/1986 | |
| DE | 3829281 | 5/1989 | |
| DE | 3911847 | 10/1990 | |
| EP | 0050990 | 5/1982 | |
| EP | 0791543 | 8/1997 | |
| FR | 1376047 | 9/1964 | |
| FR | 2036163 | 12/1970 | |
| FR | 2137325 | 12/1972 | |
| FR | 2272914 | 12/1975 | |
| FR | 2489126 | 3/1982 | |
| FR | 2567068 | 7/1984 | |
| FR | 2610604 | 8/1988 | |
| FR | 2603159 | 3/1989 | |
| FR | 2619698 | 3/1989 | |
| GB | 1204647 | 9/1970 | |
| GB | 2056410 | 3/1981 | |
| GB | 2074542 | 11/1981 | |
| GB | 2128083 | 4/1984 | |
| GB | 5605 | 5/1985 | |
| GB | 2203127 | 10/1988 | |
| GB | 2212136 | 7/1989 | |
| GB | 2252708 | 8/1992 | |
| IT | 224507 | 4/1996 | |
| JP | 02138948 A * | 5/1990 | ............. A23L/1/20 |
| JP | 542958 | 2/1993 | |
| JP | 6127555 | 5/1994 | |
| JP | 8-19334 | 1/1996 | |
| JP | 2000257131 A * | 9/2000 | ............. E03C/1/26 |
| NL | 8301709 | 12/1984 | |
| NL | 1000658 | 1/1996 | |
| WO | 9315979 | 8/1993 | |
| WO | WO 96/33920 * | 10/1996 | |
| WO | 9712819 | 4/1997 | |

OTHER PUBLICATIONS

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

"Super Seller", Supermarket Floral, Sep. 15, 1992.

"Halloween", Link Magazine, Sep. 1992.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve®, published prior to Mar. 31, 1994, 2 pages.

"Stand Alone Plastic Bagmaking" AMI, Atlanta, GA, Feb. 15, 1996, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container. 1988.

"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

Adhesives Handbook, J. Shields, pp. 260, 345 & 346, 1970.

Farm Journal's House Plants For Gift Giving, V.F. & G.A. Elbert, p. 93 and third unnumbered page of photos, 1978.

"Special Occasion Printed Highlophane Bags" Brochure, Highland Supply Corporation, 1990, 2 pages.

"Creative Packaging" Brochure, John Henry Company, Sep. 1992.

"Make Highlander Your Headquarters" Brochure, Highland Supply Corporation, 1991.

* cited by examiner

METHOD OF USING A CONICAL FLORAL SLEEVE

CROSS REFERENCE TO RELATED APPLICATIONS

This application is a divisional of U.S. Ser. No. 09/614,317, filed Jul. 12, 2000, which is a continuation-in-part of U.S. Ser. No. 09/468,579, filed on Dec. 21, 1999, now U.S. Pat. No. 6,318,050 issued on Nov. 20, 2001; which is a continuation of U.S. Ser. No. 09/162,479, filed Sep. 28, 1998, now U.S. Pat. No. 6,047,524 issued on Apr. 11, 2000; which is a continuation of U.S. Ser. No. 08/872,772 filed Jun. 10, 1997, now U.S. Pat. No. 5,813,194 issued on Sep. 29, 1998; which is a continuation of U.S. Ser. No. 08/701,818, filed Aug. 23, 1996, now U.S. Pat. No. 5,735,103 issued on Apr. 7, 1998; which is a continuation of U.S. Ser. No. 08/220,852, filed Mar. 31, 1994, now U.S. Pat. No. 5,572,851 issued on Nov. 12, 1996. Each of these applications is hereby incorporated by reference herein in its entirety.

FIELD OF THE INVENTION

This invention generally relates to sleeves, and more particularly, sleeves used to contain floral groupings and media, or used to wrap flower pots containing floral groupings and/or media containing floral groupings, and methods of using same.

DESCRIPTION OF THE PREFERRED EMBODIMENTS

Shown in FIGS. 1 and 2 and designated therein by the general reference numeral 10 is a flexible preformed conical sleeve (hereinafter referred to simply as a "sleeve"). The sleeve 10 is initially formed in a flattened condition as a flexible flat collapsed piece of material which is openable in the form of a cone or sleeve which has a closed bottom, or a closed bottom having drainage holes or a partially or completely open bottom. The sleeve 10 may be truncated at its lower end and may be open or closed by a seal. Prior to shipment to the user, or prior to use by the user, the sleeve may be expanded into an opened configuration. The sleeve 10 is preferably tapered outwardly from the lower end toward a larger diameter at its upper end. In its flattened state the sleeve 10 preferably has an overall trapezoidal or modified trapezoidal shape, and when opened is substantially conical or frusto-conical in the truncated embodiment. It will be appreciated, however, that the sleeve 10 may comprise variations on the aforementioned shapes, as long as the sleeve 10 functions in accordance with the present invention in the manner described herein.

Figure 1:
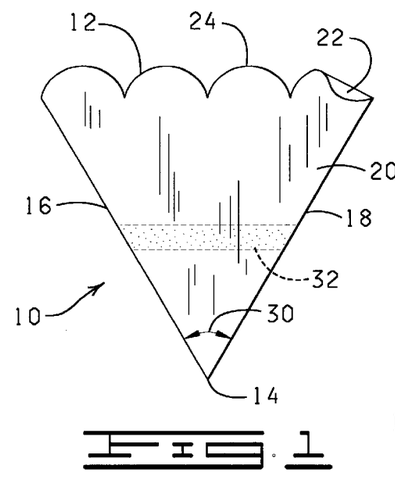
FIG. 1 is an elevational view of a sleeve constructed in accordance with the present invention.
Figure 2:
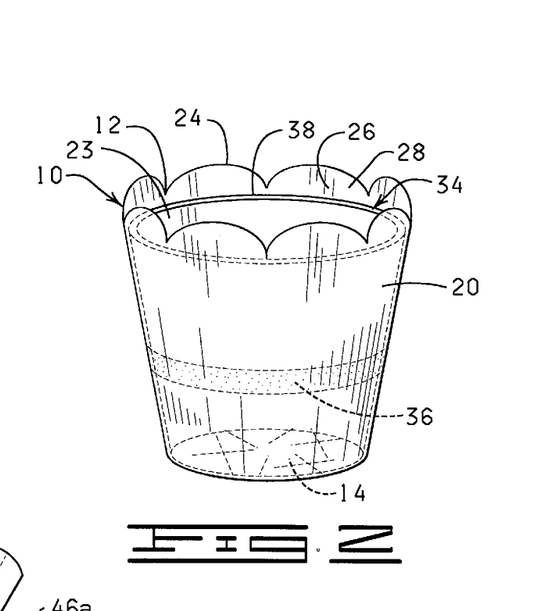
FIG. 2 is a perspective view of the sleeve of FIG. 1 opened, and having a pot disposed therein.

More particularly, the sleeve 10 of FIGS. 1 and 2 has an upper end 12, and a lower end 14, and in its flattened state has a first side 16 and a second side 18 and a first panel 20 and a second panel 22. The sleeve 10 has an opening 23 at the upper end 12 and is generally closed at the lower end 14. The sleeve 10 also has a non-linear upper edge 24 in the upper end 12. The sleeve 10 also has an inner peripheral surface 26 which, when the sleeve 10 is opened, defines and encompasses an inner retaining space 28 as indicated in FIG. 2.

Sleeve 10 has an angle 30 in the lower end 14 between first side 16 and second side 18. Preferably, the angle 30 is between 14° and 40° when the sleeve 10 is in the flattened condition. More preferably, the angle 30 is between 16° and 30°, and more preferably between 16° and 24°. Sleeve 10 further comprises a bonding material 32 disposed on a portion of the inner peripheral surface 26 in a position such that when a pot 34 is disposed within the inner retaining space 28, the bonding material 32 can be used to attach the sleeve 10 to an outer surface 36 of the pot 34. As indicated in FIG. 2, in a preferred embodiment, the sleeve 10 with the angle 30 is sized such that when the pot 34 is disposed within the inner retaining space 28, at least a portion of the non-linear upper edge 24 is positioned near an upper rim 38 of the pot 34. Furthermore, when the pot 34 is placed within the sleeve 10, a portion of the sleeve 10 near the lower end 14 generally is folded under and concealed beneath the pot 34 as indicated in FIG. 2. The lower end 14 may have a space therein for forming a fluid reservoir.

In an alternate embodiment, the invention comprises a sleeve 10a (FIG. 3) having a first side 16a which comprises a first side gusset 40a having an inner fold 42a and a second side 18a which comprises a second side gusset 44a having an inner fold 46a.

In an alternate embodiment, as noted earlier and as shown in FIG. 4, a sleeve 10b is similar to sleeve 10 except sleeve 10b has a truncated lower end 14b with an imaginary angle 30b like angle 30 in Sleeve 10. Sleeve 10b may have a gusset 48 in the lower end 14b for enabling the lower end 14b to fit more closely to a pot 34 without having to fold and conceal as much of the lower end 14b beneath the pot 34 as is required with sleeve 10. Sleeve 10b also has a bonding material 32 disposed thereon in the same manner as sleeve 10.

In yet another embodiment of the invention, a sleeve 10c (FIG. 5) may comprise a truncated lower end 14c like sleeve 10b, and may further comprise a fist side 16c having a first side gusset 40c having an inner fold 42c and a second side 18c having a second side gusset 44c having an inner fold 46c, and having a bonding material 32c. The lower end 14c may also have a gusset 48c or may be free of a gusset in the lower end 14c.

Figure 6:
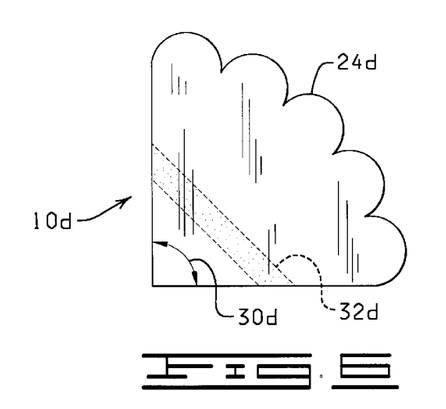
FIG. 6 is an elevational view of another sleeve constructed in accordance with the present invention.

In another embodiment, shown in FIG. 6, a sleeve 10d, similar to sleeve 10, and having a bonding material 32d, has an angle 30d which is between 80° and 100°, and is preferably 85° to 95°, and most preferably about 90°. Sleeve 10d may be modified in the manner of sleeves 10a–10c in accordance with the present invention.

Any of the sleeves described herein may be constructed without a bonding material disposed thereon, as described below.

The non-linear upper edge of the sleeves contemplated herein may have a variety of patterns. FIGS. 1–6 and 8–9 show sleeves 10–10d and 10f having non-linear upper edges 24–24d and 24f, respectively, any of which alternatively may be wavy, sinusoidal, scalloped, crenulate, crenelate, zig-zagged, or toothed, in any regular or irregular pattern as shown for example in U.S. Pat. No. 5,493,809, FIGS. 26–31, the specification and drawings of which are hereby expressly incorporated herein by reference in their entirety.

Figure 7:
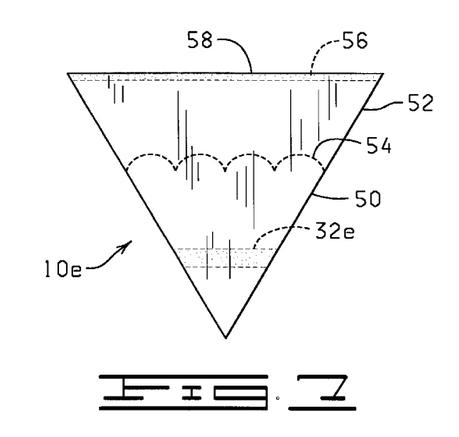
FIG. 7 is an elevational view of another sleeve constructed in accordance with the present invention.

The invention further contemplates a sleeve having an upper detachable portion such as sleeve 10e shown in FIG. 7. Sleeve 10e is constructed in a manner similar to any of sleeves 10–10d, including having a bonding material 32e, except sleeve 10e comprises a lower portion 50 and an upper portion 52. The upper portion 52 is detachable from the lower portion 50 via a detaching elements such as perforations 54 formed in any non-linear pattern contemplated elsewhere herein, or even in a straight linear pattern. The term "detaching element" as used generally herein, means any element or device or combination of elements, or features, such as, but no limited to perforations, tear strips, weakened areas, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching element" known in the art, or any combination thereof, could be substituted therefore and/or used therewith. Preferably, the upper portion 52 is sized to substantially surround and encompass a floral grouping, and lower portion 50 is sized to contain and enclose a pot 34.

Figure 8:
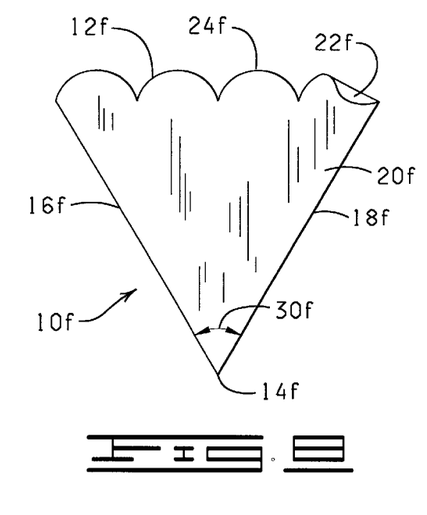
FIG. 8 is an elevational view of another sleeve constructed in accordance with the present invention.
Figure 9:
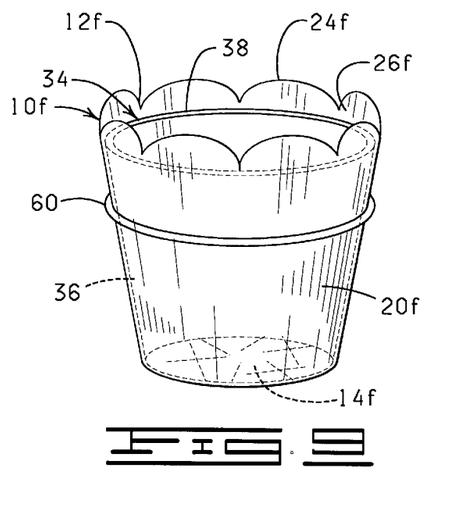
FIG. 9 is a perspective view of the sleeve of FIG. 8 opened, and having a pot disposed therein.

The invention further contemplates a sleeve such as a sleeve 10f shown in FIG. 8, which is similar to sleeve 10 but which is constructed without a bonding material disposed thereon for securing the sleeve 10f in a position about the pot 34. Sleeve 10f has an upper end 12f, a lower end 14f, a first side 16f, a second side 18f, a first panel 20f, a second panel 22f, a non-linear upper edge 24f and an angle 30f in the lower end 14f between side 16f and side 18f. The angle 30f is similar to angles 30–30b and 30d described elsewhere herein. Sleeve 10f can be applied about pot 34 as shown in FIG. 9 wherein a banding element 60 is disposed about the sleeve 10f to secure the sleeve 10f about the pot 34. A portion of the lower end 14f is folded beneath the pot 34 as indicated in FIG. 9.

Figure 10:
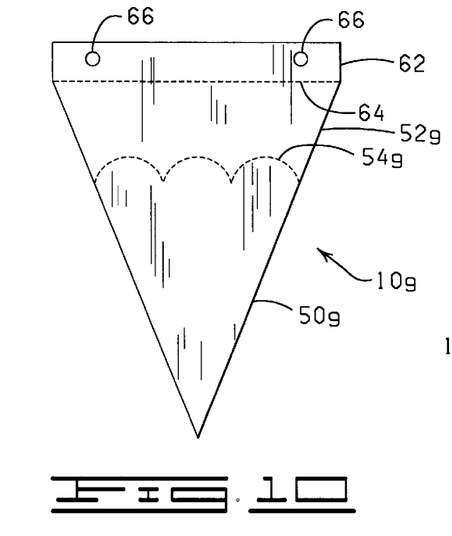
FIG. 10 is an elevational view of another sleeve constructed in accordance with the present invention.
Figure 11:
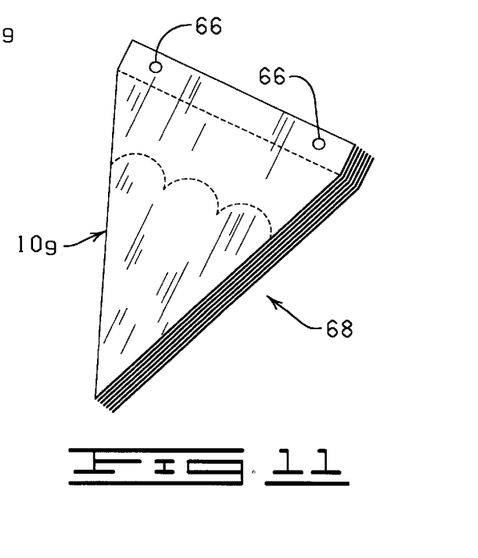
FIG. 11 is a perspective view of a plurality of sleeves of FIG. 10 disposed in a pad.
Figure 12:
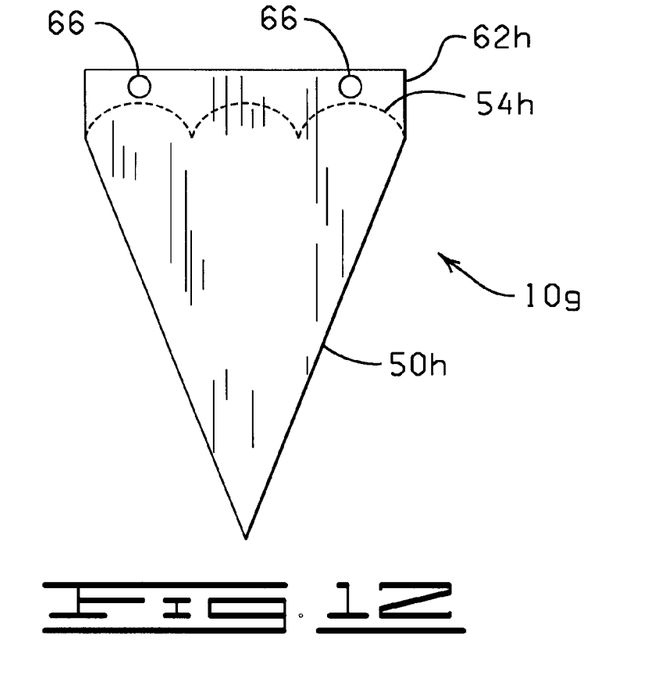
FIG. 12 is an elevational view of another sleeve constructed in accordance with the present invention.

Shown in FIG. 10 is a sleeve 10g which is similar to sleeve 10e in FIG. 7 in that sleeve 10g has a lower portion 50g, an upper sized to surround a floral grouping portion 52g and a detaching element such as perforations 54g. Sleeve 10g further comprises a support portion 62 which is detachable from upper portion 52g via perforations 64 and which may have apertures 66 for enabling the sleeve 10g to be supported from a support device such as a wicket (not shown) but which is well known by a person of ordinary skill in the art. A plurality of sleeves 10g may be stacked together to form a pad 68 as shown in FIG. 11 and which may be supported on a support assembly such as a wicket or on a belt worn by a floral worker, for example in a greenhouse or plant warehouse or packaging or shipping facility. Shown in FIG. 12 is another embodiment of the invention, a sleeve 10h which has a support portion 62h detachable from a lower portion 50h via a detaching element such as perforations 54h. The support portion 62h is generally not sized to surround a floral grouping and in fact, is generally removed from the lower portion 50h before the lower portion 50h of the sleeve 10h is disposed about a pot, in a manner known in the art.

Any of the sleeves 10–10h described herein may be modified so that the bonding material 32–32e is replaced with a banding element such as banding element 60 for securing the sleeve 10–10e about a pot. The banding element may be, for example, a rubber or elastic band, a string, a ribbon, a collar, a wire, a band or another banding device known to a person of ordinary skill in the art. The banding element 60 may be preconnected to the sleeves described herein before application of the sleeve about the pot or it may be applied, either manually or automatically after the pot is disposed within the sleeve.

The sleeves 10–10h are constructed from material which is flexible, semi-rigid, rigid, or any combination thereof. The sleeve 10–10h may be constructed of a single layer of material or a plurality of layers of the same or different types of materials. Any thickness of the material may be utilized as long as the material functions in accordance with the present invention and is expandable to an open position as described herein. The layers of material comprising the sleeves 10–10h may be connected together or laminated or may be separate layers. Such materials used to construct the sleeves 10–10h are described in U.S. Pat. No. 5,111,637, which is hereby incorporated herein by reference. Any thickness of material may be utilized in accordance with the present invention as long as the sleeves 10–10h may be formed as described herein, and as long as the sleeves 10–10h may contain at least a portion of a pot or potted plant or a floral grouping, as described herein. Additionally, an insulating material such as bubble film, preferable as one of two or more layers, can be utilized in order to provide additional protection for the item, such as a floral grouping, contained therein.

Generally however, the material from which the sleeves 10–10h are constructed preferably has a thickness in a range from about 0.1 mil to about 30 mils. Often, the thickness of the sleeves 10–10e are in a range from about 0.5 mil to about 10 mils. Preferably, the sleeves 10–10h have a thickness in a range from about 1.0 mil to about 5 mils.

In one embodiment, the sleeves 10–10h may be constructed from a sheet comprising two polypropylene films. The material comprising the sleeves 10–10h may be connected together or laminated or may be separate layers. In alternative embodiments, the sleeves 10–10h may be constructed from only one of the polypropylene films.

The sleeves 10–10h are constructed from any suitable material that is capable of being formed into sleeves 10–10h and wrapped about a pot 34 and a floral grouping (not shown) disposed therein. Preferably, the material comprises untreated or treated paper, metal foil, polymer film, non-polymer film, woven or nonwoven fabric, synthetic or natural fabric, cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeves 10–10h may vary in color and may consist of designs or decorative patterns which are printed, etched, and/or embossed thereon using inks or other printing materials. An example of an ink which may be applied to the surface of the material is described in U.S. Pat. No. 5,147,706, and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the sleeves 10–10h. Moreover, portions of the material used in constructing the sleeve may vary in the combination of such characteristics. The material utilized for the sleeves 10–10h may be opaque, translucent, transparent, or partially clear or tinted transparent. Any portion of the sleeves 10–10h, or the entire sleeves 10–10h may have a design, pattern or decoration printed thereon.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention as described previously, a bonding material 32–32e is disposed on a portion of the sleeves 10–10e respectively to assist in holding the sleeves 10–10e to the pot 34 therein when such a pot 34 is disposed within the sleeves 10–10e. A second bonding material 56 may be applied to an upper end 58 of sleeve 10e for sealing the upper portion 52 of the sleeve 10e after the pot 34 has been disposed therein, for example as shown in FIG. 7.

It will be understood that the bonding material 32–32e or 56 may be disposed as a strip or block on a surface of the sleeves 10–10e. Further, the bonding material 32–32e or 56 may be disposed as spots, or in any other geometric, non-geometric, asymmetric, or fanciful form, and in any pattern including covering either the entire inner peripheral surface 26 of the sleeves 10–10e. The bonding material 32–32e or 56 may be covered by a cover or release strip which can be removed prior to the use of the sleeves 10–10e. The bonding material 32–32e or 56 can be applied by means known to those of ordinary skill in their art. One method for disposing a bonding material 32–32e or 56 in this case an adhesive, is described in U.S. Pat. No. 5,493,809, which is hereby expressly incorporated herein by reference.

The term "bonding material" when used herein means an adhesive, frequently a pressure sensitive adhesive, or a cohesive. When the bonding material is a cohesive, a similar cohesive material must be placed on the adjacent surface (e.g. on the outer surface of the pot) for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material or means. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releaseable. This characteristic is different from, for example, a pressure sensitive adhesive.

Any of the sleeves described herein may also be equipped with one or more drainage holes in a lower portion thereof or ventilation holes (not shown) or can be made from permeable or impermeable materials.

Preferably the sleeves 10–10h are sized to contain and conform to one of a variety of standard sizes of pots 34 known to those of ordinary skill in the art, such as 3 inch, 4 inch, 4½ inch, 6 inch, and 8 inch pots and others. As noted above, the sleeves 10–10h may be used to contain a plant and a growing medium without the use of a pot 34.

It will be understood by a person of ordinary skill in the art that equipment and devices for forming sleeves such as sleeves 10–10h are well known to a person of ordinary skill in the art. Therefore, further discussion of the construction of the sleeves described herein is not deemed necessary.

In another embodiment, any of sleeves 10–10h may be supported by a support assembly commercially available and known by one of ordinary skill in the art, such as a wicket or staples for shipment, storage, or assembly of the sleeve 10–10h.

Figure 5:
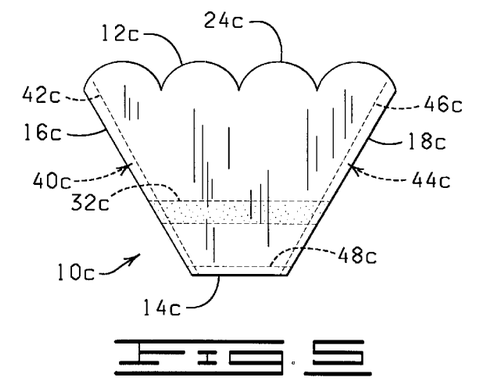
FIG. 5 is an elevational view of another sleeve constructed in accordance with the present invention.

The sleeves 10a, 10b or 10c contemplated herein may have more than one side gusset, 40a, 44a, 40c or 44c, or bottom gusset 48b or 48c for example as shown in FIG. 5 in U.S. Ser. No. 09/360,865, the specification of which is hereby expressly incorporated by reference herein in its entirety. The present invention further contemplates sleeve embodiments comprising a plurality of gussets in each side of the sleeve and/or in the bottom of the sleeve.

Figure 3:
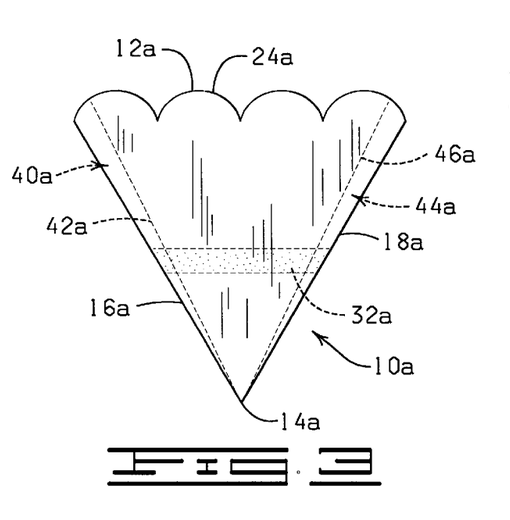
FIG. 3 is an elevational view of another sleeve constructed in accordance with the present invention.
Figure 4:
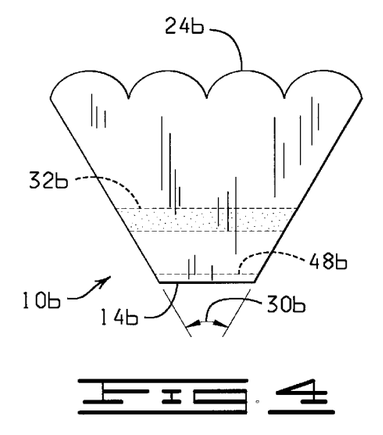
FIG. 4 is an elevational view of another sleeve constructed in accordance with the present invention.

The configuration of the bottom gusset 48b or 48c or side gussets 40a, 44a, 40c and 44c shown in the sleeves 10a, 10b and 10c of FIGS. 3–5 are not the only configurations contemplated for the present invention. Any gusset which functions in accordance with the present invention may be used.

Each side gusset 40a, 44a, 40c, or 44c described herein comprises one or more areas of excess material which may have the form of a pleat which extends from the lower end 14a or 14c to the upper end 12a or 12c, of the sleeve 10a or 10c, respectively. Preferably the surfaces of the internal facing surfaces of the gussets 40a, 44a, 40c or 44c are substantially unconnected to each other along their lengths.

The side gussets 40a, 44a, 40c and 44c contemplated herein may be constructed in such a way that each side gusset 40a, 44a, 40c and 44c extends completely from the lower end 14a or 14c of the sleeve 10a or 10c to the upper end 12a or 12c of the sleeve 10a or 10c, respectively. Alternatively, sleeve 10a or 10c may comprise gussets 40a, 44a, or 40c or 44c, respectively, which extend from the upper end 12a or 12c only part of the distance toward the lower end 14a or 14c or from the lower end 14a or 14c to only part of the distance toward the upper end 12a or 12c.

It will generally be desired to use the sleeves 10–10h as covering for a pot 34, especially when the pot 34 contains a plant or floral grouping.

The term "pot" as used herein refers to any type of container or vase used for holding a floral grouping or plant. Examples of pots, used in accordance with the present invention include, but not by way of limitation, clay pots, wooden pots, plastic pots, pots made from natural and/or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeves 10–10h without a pot 34 or other container. The sleeves described herein may be formed in a manner well known in the art by advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

It should be further noted that various other features of the versions of the present invention described herein such as closure bonding areas, support extensions, handles, additional perforations, drainage holes, ventilation holes, combinations of material may be used alone or in combination as elements of any of the embodiments described above herein.

The sleeves 10–10h may comprise a portion of a plant package as shown for example in FIG. 2, which additionally comprises a pot 34 disposed within the sleeves 10–10h, the pot 34 may have a floral grouping disposed therein and wherein the pot assembly is substantially surrounded and encompassed by the sleeve 10–10h or a portion thereof. Alternatively, the plant package may comprise only the sleeves 10–10h, a plant, and a medium for containing the plant.

These embodiments described herein are not intended to limit the scope and extent of the claimed invention but are only intended to exemplify various embodiments of the invention contemplated herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method of covering a pot having an outer peripheral surface, a bottom and an upper rim, comprising the steps of:

providing a preformed flexible sleeve comprising a closed lower end, a first panel, a second panel, a first side and a second side and having an angle between the first side and the second side wherein the preformed flexible sleeve has a conical shape or a shape which is tapered from the upper end to a truncated closed lower end and having an imaginary said performed flexible sleeve sized to cover the pot and the preformed flexible sleeve having a non-linear upper edge;

disposing the pot within the preformed flexible sleeve, wherein a portion of the inner peripheral surface of the preformed flexible sleeve is positioned adjacent the pot;

securing the preformed flexible sleeve to the outer peripheral surface of the pot via a banding element such that the preformed flexible sleeve surrounds and encompasses the outer peripheral surface of the pot; and wherein said portion of the inner peripheral surface of the preformed flexible sleeve is positioned about the pot such that the preformed flexible sleeve is secured about the pot.

2. The method of claim 1 wherein the preformed flexible sleeve is initially provided in a flattened condition.

3. The method of claim 1 wherein at least a portion of the upper non-linear edge of the preformed flexible sleeve is positioned near the upper rim of the pot.

4. The method of claim 1 comprising the additional step of folding a portion of the closed lower end of the preformed flexible sleeve beneath the bottom of the pot after the pot is disposed within the preformed flexible sleeve.

5. The method of claim 1 wherein the reformed flexible sleeve further comprises a detachable upper portion detachable via perforations.

6. The method of claim 1 wherein the detachable upper portion is sized to substantially surround and encompass a floral grouping disposed within the pot.

7. The method of claim 1 wherein the detachable upper portion further comprises an adhesive or cohesive bonding material disposed thereon for sealing an upper end of the detachable upper portion.

8. The method of claim 1 wherein the angle or imaginary angle is about 90°.

* * * * *

UNITED STATES PATENT AND TRADEMARK OFFICE
CERTIFICATE OF CORRECTION

PATENT NO. : 6,591,549 B2
DATED : July 15, 2003
INVENTOR(S) : Donald E. Weder

It is certified that error appears in the above-identified patent and that said Letters Patent is hereby corrected as shown below:

Drawings,
Delete Fig. 12 and substitute therefore new Fig. 12 as follows:

Column 2,
Line 52, delete "48" and substitute therefore -- 48b --.
Line 56, delete "32" and substitute therefore -- 32b --.
Line 60, delete "fist" and substitute therefore -- first --.

Column 3,
Line 28, delete "no".

Column 6,
Line 6, delete "either".

Column 8,
Line 27, after "imaginary" and before "said" add -- angle --.
Line 27, delete "performed" and substitute therefore -- preformed --.
Line 50, delete "reformed" and substitute therefore -- preformed --.

Signed and Sealed this

Seventh Day of September, 2004

JON W. DUDAS
*Director of the United States Patent and Trademark Office*